United States Patent [19]

Inaba et al.

[11] Patent Number: 5,275,768
[45] Date of Patent: Jan. 4, 1994

[54] INJECTION MOLDING CONDITION SETTING METHOD

[75] Inventors: Yoshiharu Inaba, Kawasaki; Takayuki Taira, Hachioji; Masao Kamiguchi, Minamitsuru; Hiroshi Watanabe, Minato, all of Japan

[73] Assignee: Fanuc Ltd, Yamanashi, Japan

[21] Appl. No.: 910,364

[22] PCT Filed: Nov. 29, 1991

[86] PCT No.: PCT/JP91/01671

§ 371 Date: Jul. 24, 1992

§ 102(e) Date: Jul. 24, 1992

[87] PCT Pub. No.: WO92/09417

PCT Pub. Date: Jun. 11, 1992

[30] Foreign Application Priority Data

Nov. 30, 1990 [JP] Japan .................. 2-330008

[51] Int. Cl.$^5$ ............................................. B29C 45/76
[52] U.S. Cl. ................. 264/40.1; 264/328.1; 425/135; 425/140; 364/476
[58] Field of Search ............ 264/40.1, 40.4, 40.5, 264/40.6, 328.1; 425/135, 140; 364/476

[56] References Cited

FOREIGN PATENT DOCUMENTS 63-209917 8/1988 Japan .
2-98419 4/1990 Japan .
2-128820 5/1990 Japan .

Primary Examiner—Jill L. Heitbrink
Attorney, Agent, or Firm—Staas & Halsey

[57] ABSTRACT

An injection molding condition setting method capable of setting optimum molding conditions quickly and easily. A processor (12) of a control device furnished with an expert system, which includes a state table containing a plurality of states each composed of a combination of mold information, resin data, molding conditions, molding defect data, and molding monitor data, and a weight table listing weighted countermeasures against defect molding set for every state, retrieves a state nearest to a trial injection state, which is discriminated in accordance with the mold information, resin data, and molding conditions set before the start of trial injection, the molding monitor data detected during the execution of the trial injection and the molding defect data inputted after the end of the trial injection, from the state table, and determines a molding defect countermeasure corresponding to the retrieved state and having the maximum weight with reference to a weight table. While the trial injection is repeated with the molding conditions modified in accordance with the molding defect countermeasure, the processor modifies, as required, the weight of the molding defect countermeasure for the preceding cycle of trial injection depending on the result of comparison between a molding defect occurred in the preceding trial injection cycle and one occurred in the present trial injection cycle.

5 Claims, 5 Drawing Sheets

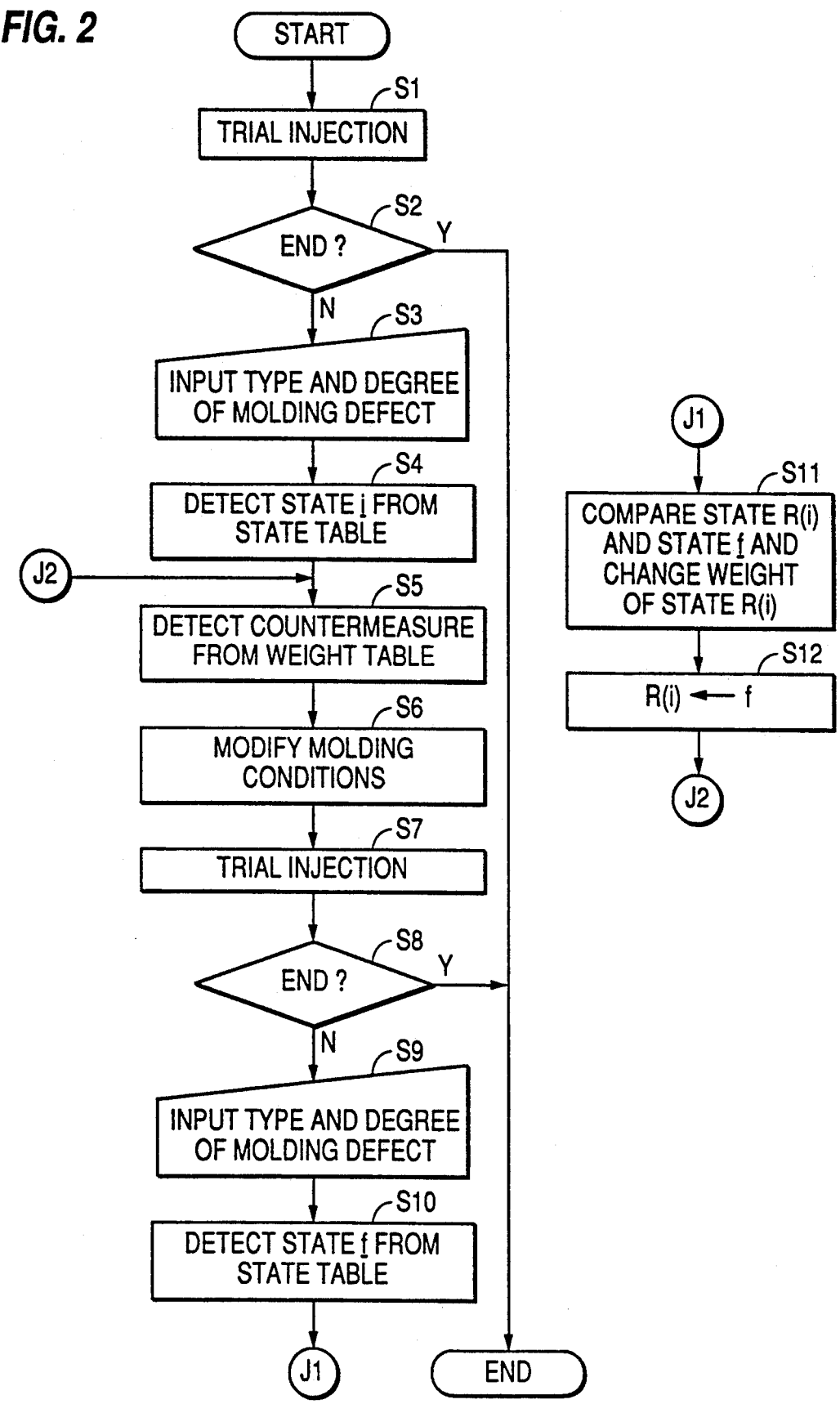

FIG. 3

| STATE | 1 | 2 | 3 | ... | x |
|---|---|---|---|---|---|
| MOLD INFORMATION | | | | | |
| PROJECTION AREA (cm²) | 40 | 40 | 40 | ... | 40 |
| GATE DIAMETER (mm) | 2 | 2 | 2 | ... | 2 |
| GATE SHAPE | PINPOINT | PINPOINT | PINPOINT | ... | PINPOINT |
| PRODUCT NAME | CONNECTOR | CONNECTOR | CONNECTOR | ... | CONNECTOR |
| RESIN DATA | | | | | |
| KIND OF RESIN | PBT | PBT | PBT | ... | PBT |
| REGENERANT CONTENT (%) | 0 | 0 | 0 | ... | 0 |
| MOLDING CONDITIONS | | | | | |
| INJECTION SPEED (mm/sec.) | 80 | 80 | 80 | ... | 80 |
| DWELL PRESSURE (kg/cm²) | 1000 | 1000 | 850 | ... | 850 |
| DWELL TIME (sec.) | 4 | 4 | 4 | ... | 4 |
| BACK PRESSURE (kg/cm²) | 60 | 60 | 60 | ... | 60 |
| SCREW ROTATIONAL SPEED (rpm) | 80 | 80 | 80 | ... | 80 |
| INJECTION/DWELL SWITCHING POSITION (mm) | 8 | 9 | 9 | ... | 9 |
| MOLDING DEFECT DATA | | | | | |
| TYPE OF DEFECT | FINS | FINS | FINS | ... | FINS |
| DEGREE OF DEFECT | SOMEWHAT SERIOUS | MODERATE | MODERATE | ... | SLIGHT |
| MOLDING MONITOR DATA | | | | | |
| CYCLE TIME (sec.) | 25 | 24.9 | 24.9 | ... | 24.9 |
| INJECTION TIME (sec.) | 1.5 | 1.4 | 1.4 | ... | 1.4 |
| METERING TIME (sec.) | 8 | 8 | 8 | ... | 8 |
| CUSHIONING DEPTH (mm) | 5 | 5.5 | 5 | ... | 5.5 |

FIG. 4

| STATE | 1 | 2 | 3 | ... | x |
|---|---|---|---|---|---|
| INJECTION SPEED + 10mm/sec. | 0 | 0 | 0 | ... | 0 |
| INJECTION SPEED - 10mm/sec. | 3 | 3 | 5 | ... | 4 |
| INJECTION SPEED + 5mm/sec. | 0 | 0 | 0 | ... | 0 |
| INJECTION SPEED - 5mm/sec. | 2 | 2 | 1 | ... | 5 |
| DWELL PRESSURE + 100kgf/cm² | 0 | 0 | 0 | ... | 0 |
| DWELL PRESSURE - 100kgf/cm² | 1 | 4 | 2 | ... | 1 |
| BACK PRESSURE + 10kgf/cm² SCREW ROTATIONAL SPEED -10rpm | 0 | 0 | 0 | ... | 0 |
| BACK PRESSURE + 10kgf/cm² SCREW ROTATIONAL SPEED -10rpm | 2 | 1 | 2 | ... | 1 |
| INJECTION/DWELL SWITCHING POSITION + 1mm | 5 | 1 | 2 | ... | 1 |
| INJECTION/DWELL SWITCHING POSITION - 1mm | 0 | 0 | 1 | ... | 0 |

FIG. 5

| STATE | 1 | 2 | 3 | ... | x |
|---|---|---|---|---|---|
| INJECTION SPEED + 10mm/sec. | 0 | 0 | 0 | ... | 0 |
| INJECTION SPEED - 10mm/sec. | 3 | 3 | 5 | ... | 4 |
| INJECTION SPEED + 5mm/sec. | 0 | 0 | 0 | ... | 0 |
| INJECTION SPEED - 5mm/sec. | 2 | 2 | 1 | ... | 5 |
| DWELL PRESSURE + 100kgf/cm² | 0 | 0 | 0 | ... | 0 |
| DWELL PRESSURE - 100kgf/cm² | 1 | 3 | 2 | ... | 1 |
| BACK PRESSURE + 10kgf/cm² SCREW ROTATIONAL SPEED -10rpm | 0 | 0 | 0 | ... | 0 |
| BACK PRESSURE - 10kgf/cm² SCREW ROTATIONAL SPEED -10rpm | 2 | 1 | 2 | ... | 1 |
| INJECTION/DWELL SWITCHING POSITION + 1mm | 6 | 1 | 2 | ... | 1 |
| INJECTION/DWELL SWITCHING POSITION - 1mm | 0 | 0 | 1 | ... | 0 |

INJECTION MOLDING CONDITION SETTING METHOD

TECHNICAL FIELD

The present invention relates to an injection molding condition setting method, more particularly, to a method for setting optimum molding conditions by utilizing an expert system.

BACKGROUND ART

In general, a set of optimum molding conditions for manufacturing conforming articles are set by the method of trial and error before mass-producing molded articles. More specifically, one or more molding conditions are modified depending on the type and degree of a molding defect of the molded articles occurred in a molding cycle tried under provisional molding conditions, and the molding cycle is executed repeatedly until the optimum molding conditions are obtained. However, a number of molding conditions are concerned in the molding cycle which is composed of a series of processes such as injection, dwell, metering, etc. Besides, the molding conditions interact with one another. Thus, setting the optimum molding conditions requires much time and labor, as well as skill.

These problems may be solved by constructing a conventional expert system, such as a troubleshooting system, which is comparable to an expert in problem solving capability. It is difficult, however, to put the expert system to practical use, and correction or modification of the system in practical use is a laborious work. Moreover, in some cases the system requires reconstruction. Having these problems on application, the expert system cannot be easily utilized for injection molding.

DISCLOSURE OF THE INVENTION

The object of the present invention is to provide a method capable of setting optimum molding conditions quickly and easily by utilizing an expert system, as well as facilitating the use of the expert system.

In order to achieve the above object, an injection molding condition setting method according to the present invention comprises: (a) previously constructing an expert system including a knowledge base set by giving weight to a molding defect countermeasure for each combination of a first parameter group associated with molding cycles and a second parameter group associated with molding defects, (b) automatically detecting the remainder of the first parameter group in a molding cycle while trying the molding cycle under a set of molding conditions corresponding to a part of the first parameter group and set in advance, (c) examining a molded article obtained by the tried molding cycle and manually inputting the second parameter group associated with the molded article, (d) automatically modifying at least one molding condition in accordance with a molding defect countermeasure selected by the expert system on the basis of the first parameter group, of which the part is set in advance and the remainder is automatically detected, and the manually inputted second parameter group, and executing the molding cycle under the set of modified molding conditions, and (e) automatically modifying the weight of the molding defect countermeasure selected in the process (d), in accordance with the first and second parameter groups associated with the molding cycle executed under the unmodified molding conditions and the first and second parameter groups associated with the molding cycle executed under the modified molding conditions.

Preferably, the knowledge base includes a state table, containing a plurality of sets of predetermined combinations of the first and second parameter groups, and a weight table in which the molding defect countermeasure for each combination of the first and second parameter groups is set with a weight. Further, the knowledge base includes a state evaluation reference for specifying one of the plurality of sets of predetermined combinations stored in the state table which is nearest to the combination of the first and second parameter groups associated with the tried molding cycle, a countermeasure decision reference for selecting one of the plurality of molding defect countermeasures stored in the weight table which corresponds to the specified combination, and a weight modification reference for modifying the weight of the molding defect countermeasure selected in the process (d), in accordance with the first and second parameter groups associated with the molding cycle executed under the molding conditions before the modification and the first and second parameter groups associated with the molding cycle executed under the molding conditions after the modification.

According to the present invention, as described above, the molding conditions are automatically modified in accordance with the molding defect countermeasure selected by the expert system on the basis of the first parameter group, which is associated with the tried molding cycle, and the second parameter group, which is associated with molding defects manually inputted according to the result of examination of the molded article obtained by this molding cycle, so that optimum molding conditions can be set easily and quickly even by an unskilled operator. Since the weight of the molding defect countermeasure is automatically modified in accordance with the first and second parameter groups associated with the molding cycle executed under the unmodified molding conditions and the first and second parameter groups associated with the molding cycle executed under the modified molding conditions, the bases for determining the molding defect countermeasure and hence the optimum molding conditions can progressively be rationalized every time the molding cycle is executed.

Preferably, one of the plurality of sets of predetermined parameter combinations, set in the state table and constituting the expert system together with the weight table, state evaluation reference, countermeasure decision reference and weight modification reference, which is nearest to the parameter combination associated with the tried molding cycle is specified in accordance with the state evaluation reference. The molding conditions are modified according to the molding defect countermeasure which corresponds to the combination thus specified and is selected in accordance with the countermeasure decision reference. Further, the weight of the previously selected molding defect countermeasure is modified on the weight table in accordance with the weight modification reference and on the basis of the first and second parameter groups associated with the molding cycle executed under the unmodified molding conditions and the first and second parameter groups associated with the molding cycle executed under the modified molding conditions. Accordingly, the molding conditions can be properly modified by using the expert system while the molding cycle is repeatedly tried for the optimum molding conditions, and this enables the optimum molding conditions to be set quickly.

BRIEF DESCRIPTION OF THE DRAWINGS

FIG. 2 is a flow chart showing a molding condition setting process to be executed by means of the control device of FIG. 1;

FIG. 3 is a diagram illustrating a state table used in the molding condition setting process;

FIG. 4 is a diagram illustrating a weight table used in the molding condition setting process; and FIG. 5 is a diagram illustrating a modified weight table based on the molding condition setting process.

BEST MODE OF CARRYING OUT THE INVENTION

Figure 1:
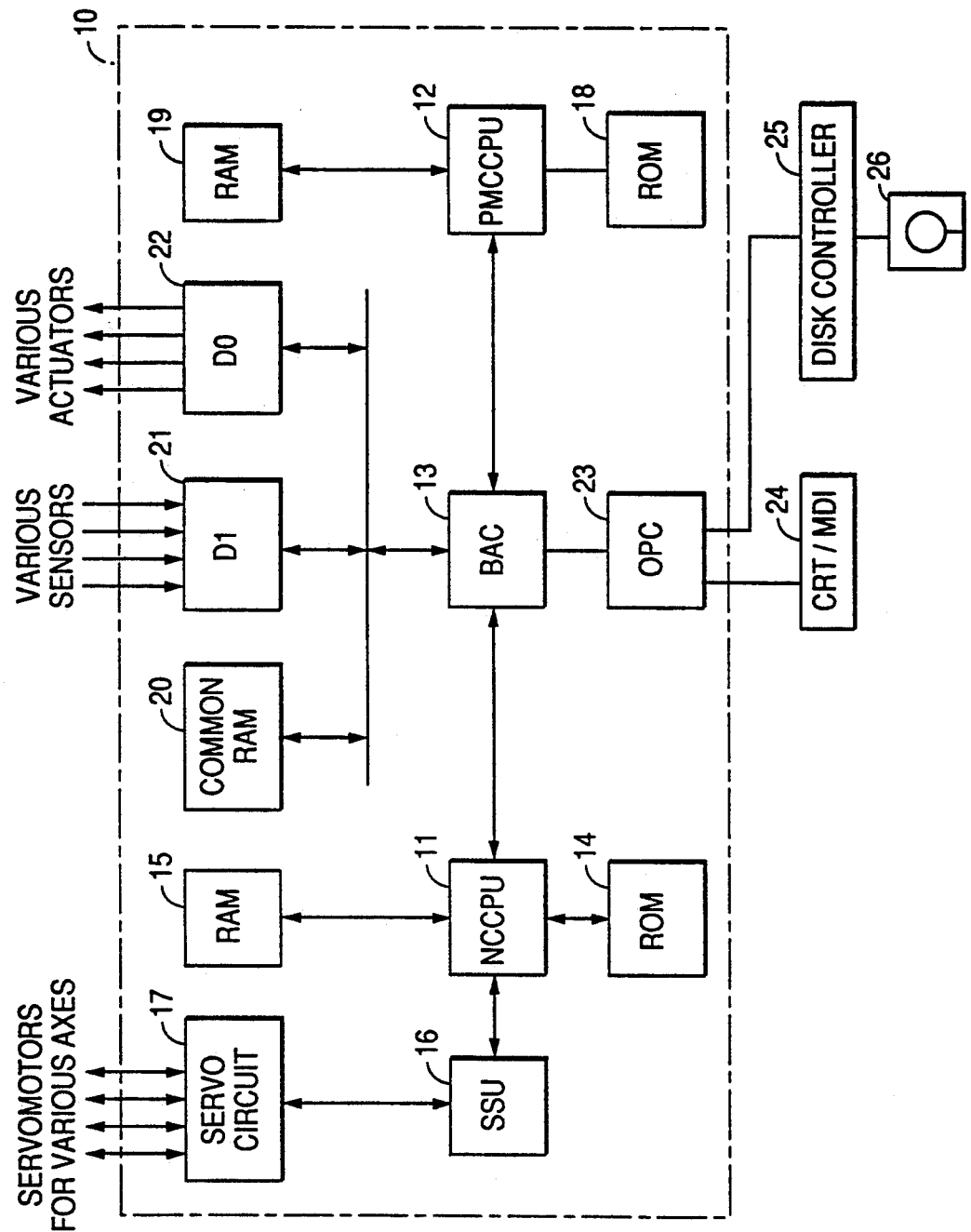
FIG. 1 is a block diagram showing the principal part of a control device of an injection molding machine for carrying out an injection molding condition setting method according to one embodiment of the present invention.

An injection molding machine to which the present invention is to be applied comprises various mechanisms (not shown) such as an injection mechanism, mold clamping mechanism, ejector, etc., and a control section for operatively controlling the various mechanisms, the control section being composed of a numerical control device (NC device) which is denoted by reference numeral 10 in FIG. 1. The NC device 10, which has a numerical control function and a sequence control function, comprises a microprocessor (NCCPU) 11 for numerical control and a microprocessor (PMCCPU) 12 for a programmable controller.

The NCCPU 11 is connected to a ROM 14, which is stored with management programs for generally controlling the injection molding machine, and a RAM 15 used for temporary storage of data and the like, and is also connected to a servo circuit 17 for operatively controlling servomotors for various axes through a servo interface 16. The PMCCPU 12 is connected to a ROM 18, which is stored with sequence programs for controlling the sequence operation of the injection molding machine, for example, and a RAM 19 used for temporary storage of data and the like.

The NC device 10 further comprises a bus arbiter controller (BAC) 13 for bus arbitration. The BAC 13 is connected to the respective buses of the two CPUs 11 and 12, a common memory 20, an input circuit 21 and an output circuit 22. The common memory 20, which is formed of a nonvolatile RAM, for example, includes a first memory section for storing NC programs and the like for controlling the operation of the injection molding machine, a second memory section for storing a set of molding conditions for molding cycles and a third memory section for storing preset data such as the mold type, kind of resin, etc. The input circuit 21 and the output circuit 22 are respectively connected to various sensors (not shown) and various actuators (not shown) attached to the various mechanisms of the injection molding machine, the servo circuit 17 and their corresponding ones of peripheral apparatuses. Reference numeral 24 denotes a manual data input device with CRT display unit (CRT/MDI) which are respectively connected to the BAC 13 through an operator panel controller 23. Various commands and preset data can be manually entered in the NC device 10 by manually operating soft keys, ten-keys, etc. which are attached to the CRT/MDI. Reference numeral 25 denotes a disk controller to be loaded with a floppy disk 26.

Furthermore, the NC device 10 is furnished with an expert system for setting optimum molding conditions quickly and easily. The expert system, which is previously constructed and loaded into the floppy disk 26, for example, by an expert before starting the operation of the injection molding machine, includes a knowledge base which is set by giving weight to a molding defect countermeasure for each combination of a first parameter group associated with molding cycles and a second parameter group associated with molding defects respectively.

More specifically, the knowledge base includes a state table (FIG. 3) in which predetermined combinations (states), e.g., x number of combinations, of the first and second parameter groups are set. The first parameter group is composed of, for example, mold information (projection area ($cm^2$), gate diameter (mm), gate shape, and product name), resin data (kind of resin and regenerant content (%)), molding conditions (injection speed (mm/sec.), dwell pressure ($kg/cm^2$), dwell time (sec.), back pressure ($kg/cm^2$), screw rotational speed (rpm), and injection/dwell switching position (mm)), and molding monitor data (cycle time (sec.), injection time (sec.), metering time (sec.), and cushioning depth (mm)). The second parameter group is composed of molding defect data (type of defect and degree of defect).

Further, the knowledge base includes a weight table (FIG. 4) in which the molding defect countermeasure for each combination (state) of the first and second parameter groups is set with weights. The molding defect countermeasures include, for example, increase and decrease of the injection speed, increase and decrease of the dwell pressure, combination of increase of the back pressure and decrease of the screw rotational speed, and increase and decrease of the injection/dwell switching position. The respective weights of the individual molding defect countermeasures are represented, for example, by numerical values ($=0, 1, \ldots, 5$).

Furthermore, the knowledge base includes a state evaluation reference, a countermeasure decision reference, and a weight modification reference. The state evaluation reference is used to specify one of a plurality of sets of predetermined parameter combination (states) which is nearest to the parameter combination associated with a tried molding cycle. The countermeasure decision reference is used to select a molding defect countermeasure which corresponds to the specified combination, from among a plurality of molding defect countermeasures set in the weight table. The weight modification reference is used to modify the weight of the molding defect countermeasure based on the first and second parameter groups associated with the molding cycle executed under the molding conditions before the modification and the first and second parameter groups associated with the molding cycle executed under the molding conditions after the modification. For example, these three references are set as follows.

State Evaluation Reference (1) The state of the tried molding cycle should be specified in accordance with a state which includes more parameters of the same numerical values or contents as parameters (state elements) associated with the molding cycle concerned than any other of the x number of states set in the state table.

(2) If the state table contains two or more states which include equal numbers of state elements identical with the state elements associated with the tried molding cycle, the state of the tried molding cycle should be specified in accordance with one of the two or more states which has the smallest state number.

Countermeasure Decision Reference (1) From among molding defect countermeasures which corresponds to the states of the molding cycle specified according to the state evaluation reference and are set in the weight table, the molding defect countermeasure of the greatest weight should be selected as a molding defect countermeasure for the tried molding cycle.

(2) If the weight table contains two or more molding defect countermeasures in which weights are the greatest as well as equal to each other, one of these two or more molding defect countermeasures which was given the first priority in description order in the weight table should be selected as a molding defect countermeasure for the tried molding cycle.

Weight Modification Reference (1) If the type of the molding defect occurred before the execution of the molding defect countermeasure is different from that of the molding defect occurred after the execution of the molding defect countermeasure, the numerical value indicative of the weight of the molding defect countermeasure should be decremented by "1".

(2) If the type of the molding defect occurred before the execution of the molding defect countermeasure is identical with that of the molding defect occurred after the execution of the molding defect countermeasure, and the degree of the molding defect has been improved, then the numerical value indicative of the weight of the molding defect countermeasure should be incremented by "1".

(3) If the type of the molding defect occurred before the execution of the molding defect countermeasure is identical with that of the molding defect occurred after the execution of the molding defect countermeasure, and the degree of the molding defect is worsened, the numerical value indicative of the weight of the molding defect countermeasure should be decremented by "1".

(4) If the numerical value indicative of the weight of the molding defect countermeasure becomes greater than "6" when it is incremented according to item (2), the numerical value should not be modified.

(5) If the numerical value indicative of the weight of the molding defect countermeasure becomes smaller than "0" when it is decremented according to item (3), the numerical value should not be modified.

The following is a description of a molding condition setting process to be executed by means of the NC device 10.

In trying a first molding cycle for setting optimum molding conditions, an operator manually enters the mold information and the resin data into the NC device 10 through the CRT/MDI 24. The mold information and the resin data are loaded into a third memory section of the common RAM 20. Then, the operator operates the CRT/MDI 24 to cause necessary ones of various molding condition setting menus, such as "injection/metering setting menu," "mold open-close/- product ejection setting menu," "temperature setting menu," etc., to be successively displayed on the CRT screen, and manually inputs a provisional set of molding conditions. The molding conditions are loaded into a second memory section of the common RAM 20.

When the operator then inputs a molding condition setting process start command through the CRT/MDI 24, the PMCCPU 12 reads out a molding condition setting process program, which has been prepared in accordance with the aforesaid state evaluation reference, countermeasure decision reference and weight modification reference, and the aforesaid state and weight tables from the floppy disk 26, loads them into the RAM 19 and starts the molding condition setting process shown in FIG. 2.

First, the PMCCPU 12, in cooperation with the NCCPU 11, operatively controls the various mechanisms of the injection molding machine in accordance with the provisional molding conditions, thereby carrying out a first cycle of trial injection (Step S1). In the meantime, the molding monitor data are detected. When the trial injection is finished, the operator examines the resulting molded article. If it is discriminated that the obtained article is conforming, the operator manually inputs a molding condition setting process end command through the CRT/MDI 24. If it is concluded that this command is inputted (Step S2), the PMCCPU 12 finishes the molding condition setting process.

In general, molded articles obtained by trial injection under the provisional molding conditions are subject to some molding defect. In this case, the operator manually inputs the type and degree of the molding defect through the CRT/MDI 24. If the entry of the molding defect data is discriminated (Step S3), the CPU 12 discriminates the state of trial injection (combination of parameters) based on the mold information, resin data and molding conditions, which are set before the start of the trial injection, the molding monitor data detected during the execution of the trial injection, and the molding defect data inputted after the end of the trial injection, thereby discriminating the trial injection state shown in Table 1, for example. Then, the CPU 12 compares the state elements (parameters) which constitute the trial injection state with the state elements which individually constitute the x number of states "1", "2", ..., "x" set in the state table (FIG. 3), and discriminates the state which includes the greatest number of identical state elements. If the state table contains two or more states including the largest number of identical state elements, one of the states which has the smallest state number is discriminated. In this case, a state "1" is discriminated as a state "i" for specifying the trial injection state by comparing the trial injection state shown in Table 1 and the state table of FIG. 3, and the state number "1" is loaded into a built-in register R(i) of the CPU 12 (Step S4).

TABLE 1

Mold Information

Projection area ($cm^2$): 40
Gate diameter (mm): 2
Gate shape: Pinpoint
Product name: Connector Resin Data Kind of resin: PBT
Regenerant content (%): 0

Molding Conditions

Injection speed (mm/sec.): 80
Dwell pressure (kg/cm$^2$): 1,000
Dwell time (sec.): 4
Back pressure (kg/cm$^2$): 60
Screw rotational speed (rpm): 80
Injection/dwell switching position (mm): 8

Molding Defect Data

Type of defect: Burrs
Degree of defect: Fairly serious

Molding Monitor Data

Cycle time (sec.): 25
Injection time (sec.): 1.5
Metering time (sec.): 8
Cushioning depth (mm): 5

Then, the PMCCPU 12 sets the molding defect countermeasure with reference to the weight table of FIG. 4 and in accordance with the countermeasure decision reference (Step S5). More specifically, the CPU 12 discriminates the maximum one of numerical values given individually in columns of the weight table corresponding to the state "1" (state "i" in general) for specifying the trial injection state and indicative of weights, and discriminates a molding defect countermeasure corresponding to this maximum value. If there are two or more molding defect countermeasures for the maximum weight, the molding defect countermeasure which was given the first priority in description order in the weight table is obtained. In this case, a molding defect countermeasure "injection/dwell switching position+1 mm" is obtained. In accordance with the molding defect countermeasure set in this manner, the CPU 12 modifies one or more of a set of molding conditions set in the second memory section of the common RAM 20 (Step S6). In this case, the value for the injection/dwell switching position is increased by 1 mm.

Then, the trial injection is effected under the modified molding conditions (Step S7), during which the molding monitor data are detected. When the operator manually inputs the molding condition setting process end command, concluding that the conforming article is obtained after examining the molded article obtained by the trial injection (Step S8), the PMCCPU 12 finishes the molding condition setting process. When the operator inputs the molding defect data (Step S9), the CPU 12 discriminates the state of a second cycle of trial injection in the same manner as in the case of the first trial injection cycle, thereby discriminating the trial injection shown in Table 2, for example. Further, as in the case of Step S4, a state "f" (state "2" in this case) for specifying the trial injection state is selected from the state table (Step S10).

TABLE 2

Mold Information

Projection area (cm$^2$): 40
Gate diameter (mm): 2
Gate shape: Pinpoint
Product name: Connector

Resin Data

Kind of resin: PBT
Regenerant content (%): 0

Molding Conditions

Injection speed (mm/sec.): 80
Dwell pressure (kg/cm$^2$): 1,000
Dwell time (sec.): 4
Back pressure (kg/cm$^2$): 60
Screw rotational speed (rpm): 80
Injection/dwell switching position (mm): 9

Molding Defect Data

Type of defect: Burrs
Degree of defect: Moderate

Molding Monitor Data

Cycle time (sec.): 25
Injection time (sec.): 1.4
Metering time (sec.): 8
Cushioning depth (mm): 5.5

Then, the PMCCPU 12 modifies, as required, the weight of the molding defect countermeasure set in Step S5, which is to follow the first trial injection cycle and to be applied to the second trial injection cycle (Step S11). The molding defect data included in the state "1" (state "i" in general) represented by the value "1" stored in the register R(i) and specifying the state of the first trial injection cycle is compared with those included in the state "2" (state "f" in general) obtained in Step S11 and specifying the state of the second trial injection cycle. If the type of the molding defect occurred during the first trial injection cycle is different from that occurred during the second trial injection cycle, the numerical value indicative of the weight of the molding defect countermeasure is decremented by "1". If the type of the molding defect occurred before the execution of the molding defect countermeasure is identical with that of the molding defect occurred after the execution of the molding defect countermeasure with the degree of the molding defect improved, the numerical value indicative of the weight of the molding defect countermeasure is incremented by "1." If the type of the molding defect occurred before the execution of the molding defect countermeasure is identical with that of the molding defect occurred after the execution of the molding defect countermeasure with the degree of the molding defect worsened, the numerical value indicative of the weight of the molding defect countermeasure is decremented by "1". However, if the numerical value indicative of the weight of the molding defect countermeasure becomes greater than "6" when it is incremented, or if the numerical value indicative of the weight of the molding defect countermeasure becomes smaller than "0" when it is decremented, the numerical value is not modified.

If the states of the first and second trial injection cycles are specified by the states "1" and "2" respectively as mentioned before, the molding defects in the states "1" and "2" are of the same type, and the degree of the molding defect is improved from "fairly serious" to "moderate," so that a numerical value "5", indicative of the weight of the previously applied molding defect countermeasure "injection/dwell switching position+1 mm," is incremented to "6" in Step S11.

Then, the PMCCPU 12 loads the state number "2" (state number "f" in general), which is indicative of the state "2" selected in Step S10, into the register R(i) (Step S12). Thereafter, the program returns to Step S5, whereupon the molding defect countermeasure corresponding to the result of the second trial injection cycle is determined in the same manner as aforesaid, and a third trial injection cycle is carried out under the molding conditions modified in accordance with this molding defect countermeasure (Steps S6 and S7). In this case, the third trial injection cycle is carried out with the dwell pressure decreased by 100 kgf/cm$^2$ in accordance with a molding defect countermeasure "dwell pressure-100 kgf/cm$^2$" having the maximum weight "4" in a column for the state "2" in the weight table of FIG. 4.

If no conforming article can be obtained after the third trial injection cycle, the processes of Steps S9 to S12 are executed. If descriminated is the state shown in Table 3 involving a molding defect "sink marks" which is different from a molding defect "burrs" occurred in the second trial injection cycle, the weight "4" of the molding defect countermeasure "dwell pressure-100 kgf/cm$^2$" for the second trial injection cycle is changed into "3" (see FIG. 5). Thus, the contents of the weight table are automatically rewritten in accordance with the result of the trial injection every time the trial injection is finished, whereby the contents of the weight tables are further rationalized.

Thereafter, the trial injection is repeated until the conforming article can be obtained, by modifying the molding conditions in accordance the molding defect countermeasure determined in the aforesaid manner every time the trial injection is finished.

TABLE 3

Mold Information

Projection area (cm$^2$): 40
Gate diameter (mm): 2
Gate shape: Pinpoint
Product name: Connector Resin Data Kind of resin: PBT
Regenerant content (%): 0

Molding Conditions

Injection speed (mm/sec.): 80
Dwell pressure (kg/cm$^2$): 1,000
Dwell time (sec.): 4
Back pressure (kg/cm$^2$): 60
Screw rotational speed (rpm): 80
Injection/dwell switching position (mm): 8

Molding Defect Data

Type of defect: Sink marks
Degree of defect: Slight defect

Molding Monitor Data

Cycle time (sec.):
Injection time (sec.):
Metering time (sec.):
Cushioning depth (mm):

When the trial injection state is specified by the state "1" while the weight table of FIG. 5 is used, the value for the injection/dwell switching position is increased by 1 mm in accordance with the molding defect countermeasure which corresponds to the maximum weight "6" in a column associated with the state "1" of the weight table. If the trial injection state is specified by the state "2", the injection speed is reduced in accordance with the molding defect countermeasure, which is one of the two molding defect countermeasures "injection speed-10 mm/sec." and "dwell pressure-100 kgf/cm$^2$" respectively corresponding to the maximum weight "3" in weight table columns associated with the state "2", and listed before the other in the weight table.

The present invention is not limited to the embodiment described above, and various modifications may be effected therein.

In the above embodiment, for example, the molding condition setting process program is transferred from the floppy disk 26 to the RAM 19 in response to the molding condition setting process start command. Alternatively, however, this program may be loaded into the ROM 18. Also, the molding condition setting process is executed by means of the PMCCPU 12 of the NC device 10 in the above embodiment; however, a computer for the molding condition setting process may be provided separately. In this case, the molding defect countermeasure is determined on the computer side in accordance with the mold information, resin data, molding conditions and molding monitor data, which are transmitted from the NC device 10 every time the trial injection is finished, and the manually inputted molding defect data, and the molding conditions are modified on the side of the NC device 10 in accordance with molding defect countermeasure data transmitted from the computer.

We claim:

1. An injection molding condition setting method comprising:
   (a) constructing an expert system including a knowledge base set by assigning a weight to each molding defect countermeasure for each combination of a first parameter group associated with molding cycles and a second parameter group associated with molding defects;
   (b) automatically detecting a first portion of said first parameter group in a molding cycle while executing said molding cycle under a set of molding conditions corresponding to a second portion of said first parameter group set in advance;
   (c) examining a molded article obtained by the molding cycle executed in process (b) and manually inputting into the expert system said second parameter group associated with said molded article;
   (d) automatically modifying at least one molding condition in accordance with a molding defect countermeasure selected by said expert system on the basis of the weights corresponding to the combination of the first parameter group, of which the first portion is set in advance and the second portion is automatically detected, and the manually inputted second parameter group, and executing the molding cycle under the set of modified molding conditions; and
   (e) automatically modifying the weight of the molding defect countermeasure selected in said process (d), in accordance with the first and second parameter groups associated with the molding cycle executed under said unmodified molding conditions and the first and second parameter groups associated with the molding cycle executed under said modified molding conditions.

2. An injection molding condition setting method according to claim 1, wherein said knowledge base of said expert system constructed in said process (a) includes a state table containing a plurality of sets of predetermined combinations of said first and second parameter groups, a weight table in which the molding defect countermeasure for each combination of said first and second parameter groups is set with a weight, a state evaluation reference for specifying one of said plurality of sets of predetermined combinations stored in said state table which is nearest to the combination of the first and second parameter groups associated with the molding cycle executed in process (b), a countermeasure decision reference for selecting one of said plurality of molding defect countermeasures stored in said weight table which corresponds to said specified combination, and a weight modification reference for modifying the weight of the molding defect countermeasure selected in said process (d), in accordance with the first and second parameter groups associated with the molding cycle executed under the molding conditions before said modification and the first and second parameter groups associated with the molding cycle executed under the molding conditions after said modification.

3. An injection molding condition setting method according to claim 1, wherein the second parameter group contains information on type of molding defect and extent of molding defect.

4. An injection molding condition setting method according to claim 1, wherein the countermeasure selected in process (d) is selected based upon which countermeasure has a highest weight, and if more than one countermeasure has the highest weight, the first countermeasure read from the expert system is selected.

5. An injection molding condition setting method according to claim 1, wherein the weight of the molding defect counter-measure selected in process (d) is modified in process (e) by the substeps comprising:

- decrementing the weight by "1" if the molding defect from the molding cycle executed under said unmodified molding conditions is different from the molding defect from the molding cycle executed under said modified molding conditions;
- incrementing the weight by "1" if the molding defect from the molding cycle executed under said unmodified molding conditions is substantially identical to the molding defect from the molding cycle executed under said modified molding conditions, and a degree of the molding defect has been improved; and
- decrementing the weight by "1" if the molding defect from the molding cycle executed under said unmodified molding conditions is substantially identical to the molding defect from the molding cycle executed under said modified molding conditions, and the degree of molding defect is worsened.

* * * * *